United States Patent [19]
Ogus

[11] Patent Number: 5,826,041
[45] Date of Patent: Oct. 20, 1998

[54] METHOD AND SYSTEM FOR BUFFERING NETWORK PACKETS THAT ARE TRANSFERRED BETWEEN A V86 MODE NETWORK DRIVER AND A PROTECTED MODE COMPUTER PROGRAM

[75] Inventor: Aaron William Ogus, Kirkland, Wash.

[73] Assignee: Microsoft Corporation, Redmond, Wash.

[21] Appl. No.: 747,186

[22] Filed: Nov. 12, 1996

Related U.S. Application Data

[63] Continuation of Ser. No. 144,280, Oct. 28, 1993, abandoned.

[51] Int. Cl.$^6$ ....................................................... G06F 13/00
[52] U.S. Cl. ............................................ 395/250; 395/681
[58] Field of Search ........................ 395/200.02, 200.08, 395/872, 876, 877, 200.2, 200.13, 250, 681

[56] References Cited

U.S. PATENT DOCUMENTS

| | | | |
|---|---|---|---|
| 4,663,706 | 5/1987 | Allen et al. | 395/200 |
| 4,817,085 | 3/1989 | De Prycker | 370/60 |
| 5,187,780 | 2/1993 | Clark et al. | 395/325 |
| 5,193,149 | 3/1993 | Awiszio et al. | 395/200 |

FOREIGN PATENT DOCUMENTS

| | | |
|---|---|---|
| 0 198 559 A1 | 10/1986 | European Pat. Off. . |
| 1-026961 | 1/1989 | Japan . |

OTHER PUBLICATIONS

Banks et al., "A High–Performance Network Architecture for a PA–RISC Workstation," IEEE Journal of Selected Areas in Communications, vol. 11, No. 2, Feb. 1993.

Clark et al., "An Analysis of TCP Processing Overhead," IEEE Communications Magazine, Jun. 1989.

Dalton et al., "Afterburner," IEEE Network, Jul. 1993.

Druschel et al., "Fbufs: A High–Bandwidth Cross–Domain Transfer Facility," Operating System Review, vol. 27, No. 5, 1993.

Druschel et al., "Network Subsystem Design," IEEE Network, Jul. 1993.

Smith et al., "Giving Applications Access to Gbls Networking," IEEE Network, Jul. 1993.

Duncan, Ray, PC MAgazine, "DOS Extenders Old and New: Protected–Mode Programming in DOS", Feb. 25, 1991, V10 P. 385 (5).

"Multi–addressing Mode Microprocessor Memory Support for Personal Computers," *IBM Technical Disclosure Bulletin*, New York, vol. 34, No 10B, Mar. 1992, pp. 157–162.

"Direct Memory Access–Based Integrated Services Digital Network Telecommunications Circuit Switch Utilizing Circular Buffers," *IBM Technical Disclosure Bulletin*, New York, vol. 34, No. 6, Nov. 1991, pp. 131–133.

Knuth, *The Art of Computer Programming*, vol. 1, *Fundamental Algorithms*, 2d ed., Addison–Wesley, Reading Mass., 1988, pp. 236, 271 and 437.

"Stimulating Shared Buffer Communication in a Distributed Processing Environment," *IBM Technical Disclosure Bulletin*, vol. 34, No. 11, Apr. 1992, pp. 340–350.

Eveland, R.E., et al., "Technical for storing Variable Length Data in a Circulating Buffer," *IBM Technical Disclosure Bulletin*, vol. 26, No. 1, Jun. 1983, pp. 86–88.

"Software–Controlled Wrap–Around Buffer," *IBM Technical Disclosure Bulletin*, vol. 28, No. 12, May 1986, pp. 5314–5316.

(List continued on next page.)

*Primary Examiner*—Richard L. Ellis
*Attorney, Agent, or Firm*—Seed and Berry LLP

[57] ABSTRACT

An improved buffering mechanism for network packets is provided. In a preferred embodiment of the present invention, a circular buffer is used when sending and receiving network packets. The circular buffer is accessible by V86 mode network drivers and protected mode applications. Said circular buffer stores packets in a first-in-first-out manner, facilitates asynchronous communications across the network and services multiple clients.

21 Claims, 10 Drawing Sheets

OTHER PUBLICATIONS

Reingold, H., *Data Structures in Pascal*, Little & Brown, 1986, pp. 277–289.

Reingold, H., *Data Structures in Pascal*, Little & Brown, 1986, pp. 165–169.

Clarke, C. and T. Jordan, "DE201 Digital Ether PC–bus Adapter," Functional Specification, V1.2, Digital Equipment Corporation, 1990, Chap. 1 DE201 Hardware Description, pp. 1-1—1-25.

"EtherLink II Adapter Technical Reference Manual," Manual Part No. 4185–01, 3Com Corporation, Santa Clara, California, Jan. 1989.

"DE 83932 Systems–Oriented Network Interface Controller," National Semiconductor, Dec. 1989, pp. 1–44.

METHOD AND SYSTEM FOR BUFFERING NETWORK PACKETS THAT ARE TRANSFERRED BETWEEN A V86 MODE NETWORK DRIVER AND A PROTECTED MODE COMPUTER PROGRAM

CROSS-REFERENCE TO RELATED APPLICATION

This application is a continuation of U.S. patent application Ser. No. 08/144,280, filed Oct. 28, 1993, now abandoned.

FIELD OF THE INVENTION

The present invention relates generally to data processing systems and, more particularly, to the buffering of packets sent to or received from a network.

BACKGROUND OF THE INVENTION

Many modern microprocessors are part of an evolving product line of microprocessors provided by their respective manufacturers. The 80386 microprocessor, sold by Intel Corporation of Cupertino, Calif., is an example of such a microprocessor. The 80386 microprocessor evolved from the 80286 microprocessor, which, in turn, evolved from the 8086 and the 8088 microprocessors. The later developed microprocessors of the 8086 family have been designed to be compatible with their earlier developed counterparts and the 8088. Hence, the 80386 microprocessor can run programs that are written for the 8086 or the 8088 microprocessor (i.e., the Intel microprocessors exhibit upward compatibility).

The 8088 microprocessor is designed to run in a single mode of operation, known as "real mode." FIG. 1 depicts the addressing scheme that is employed by the 8088 microprocessor in real mode. In real mode, a 16 bit segment 100 and a 16 bit offset 102 are combined to form a 20 bit physical address 104 that specifies a location within a physical address space. The physical address 104 is formed by shifting the segment 100 four bits to the left and then adding the segment 100 with the offset 102 as shown in FIG. 1. The result is a physical address 104 that identifies a memory location 110 within a segment 108 of physical memory 106. Since 20 bits are used for physical addresses in the 8088 microprocessor, the microprocessor can only address one megabyte of memory (i.e., $2^{20}$ Bytes). This limitation is due to the use of a 20 bit address bus in the microprocessor.

The 80386 microprocessor has the ability to run in three modes: real mode, protected mode and virtual 8086 mode (also known as V86 mode). The 80386 real mode of operation is sufficiently analogous to that of the 8088 microprocessor so as to facilitate upward compatibility with programs written on the 8088 microprocessor. That is, computer programs written for the 8088 microprocessor can execute in V86 mode on the 80386 microprocessor. Therefore, programs executing in V86 mode on the 80386 microprocessor can only access the first megabyte of memory.

The 80386 protected mode of operation provides for both segmentation and paging. Segmentation divides the physical memory into variable length blocks of memory called segments. Addressing is then done in terms of an offset within a segment instead of a direct physical address. Paging is a method of mapping a page from a linear address space into a page frame in the physical address space. The pages of memory are 4k in size. The combined use of segmentation and paging in protected mode on the 80386 microprocessor supports virtualization of the address space. Virtualization refers to a technique that allows a program to view the computer system as having a larger physical memory than the computer system actually has. In a virtualized computer system, programs access physical memory by specifying an address known as a virtual address that is then translated into a physical address through the use of paging and segmentation. Therefore, when the 80386 microprocessor is executing in protected mode, the address specified by a computer program is translated into a physical address location in a different manner than when a program is executing in real mode.

FIG. 2 provides a block diagram of the addressing scheme employed in 80386 protected mode. In 80386 protected mode, the 80386 microprocessor employs a 48-bit virtual address 200. Bits 0–31 of the virtual address 200 hold an offset value 202 and bits 32–47 hold a selector 204 that is used as an index for an entry 206 in a table of addresses of segments, called a segment descriptor table 208. The entry 206 in the segment descriptor table 208 holds the base address of a segment. The base address held in entry 206 is added to the 32-bit offset 202 of the virtual address 200 by a summer 210 to yield a linear address 212.

The linear address 212 is then passed to a paging mechanism 214. The paging mechanism 214 includes page directories and tables that are used to translate the linear address 212 into a 32-bit physical address 216. The physical address 216 is used to specify location 218 within physical memory 106. In protected mode, since the physical address is 32 bits in length, up to 4 Gigabytes (i.e., $2^{32}$ Bytes) of memory can be addressed.

In V86 mode, an operating system may run real mode code in a virtualized manner while still providing some of the protection services found with protected mode. The operating system may provide a separate virtual machine for different real mode programs running on the microprocessor. Each virtual machine is an environment that is created through a combination of microprocessor capabilities and operating system software. Only one of the virtual machines is actively running on the microprocessor at any point in time. The operating system may context switch between virtual machines to change the currently active virtual machine. Every virtual machine must reside, execute instructions, and refer to memory locations within the first megabyte of the virtual memory of the computer system.

The limitations of real mode and V86 mode pose a problem in a distributed environment. In order to appreciate the problem, it is helpful first to discuss what components play central roles in communications amongst computer systems in a distributed environment. Typically, each computer system in a distributed system has a network adapter for interfacing the computer system with the network. FIG. 3 shows an example of a network adapter 314 that interfaces a computer 300 with a network 318. The computer 300 includes a central processing unit (CPU) 303 and a memory 301. The computer memory 301 contains a network driver 312 for the network adapter 314.

The network adapter 314 is responsible for sending packets to the network 318 and receiving packets the network 318. A packet, in this context, is a packaged unit of information that is in a format proper for transmission over the network 318. The network adapter 314 includes a processor 315 and resident RAM 316 for helping it perform its duties.

The network driver 312 is responsible for transmitting packets that are destined for the network 318 and for receiving packets that are received from the network 318.

The network driver 312 transmits and receives packets by buffering the packets. The problem posed by such buffering is that the network driver 312 is often a V86 mode driver and, as such, can only store the packets within the first megabyte of the virtual address space of computer memory 301.

Currently, the problem detailed above is addressed by providing a "Mapper" program. The Mapper program is situated between programs 306 that wish to receive packets or wish to send packets and the network driver 312. Programs 306 that wish to send or receive packets interface with the Mapper 308. The Mapper 308 has parts that execute in V86 mode and parts that execute in protected mode. The Mapper 308 provides buffers 310 for buffering the packets. In particular, the Mapper 308 allocates, frees and maintains linked lists of buffers 310 for interfacing between the programs 306 and the network driver 312. There is one list 302, 303, 304 for each size of buffers. In FIG. 3, the buffers 302, 303 and 304 are sizes 1.5k, 256B and 64B, respectively. All buffers of the same size are linked on the same list.

FIG. 4 shows a flow chart of the steps performed by the Mapper 308 during the process of receiving a packet from a program 306 and sending the packet to the network driver 312. The Mapper 308 allocates variable length buffers 310 within the first megabyte of memory (step 402 in FIG. 4) and stores them as linked lists (step 404). When a packet is received from the program (step 406), the Mapper 308 determines if there is a buffer large enough for the packet (step 408). If there is not a buffer large enough for the packet, the Mapper 308 waits until the network driver 312 has completed processing on a buffer that is large enough (step 410). If there is a buffer large enough for the packet, the Mapper 308 takes the smallest buffer that is large enough for the packet (i.e., the "best fit" buffer) off of a list (step 409) and stores the packet into the buffer (step 411). The size and number of the buffers is decided at the time of compilation of the Mapper 308. Next, the Mapper passes the buffer to the network driver 312 (step 412) and after the network driver 312 sends the packet and releases the buffer, the Mapper pets the buffer back into a linked list. The Mapper 308 ends processing upon a system shutdown (step 414). The Mapper 308, the network driver 312 and the buffers 310 all reside in global address space.

Problems arise when using the prior art method of buffering. As shown in FIG. 3, when the Mapper 308 is performing a send, it receives a packet from a program 306 executing in protected mode, places the packet into a buffer 310 and passes the buffer to the network driver 312. The buffer 310 is not released by the network driver 312 and not able to be used by the Mapper 308 until the network driver 312 has completely finished performing the send function. Therefore, if the Mapper 308 has run out of buffers large enough for a packet, the Mapper 308 must wait idly until the network driver 312 frees up a buffer of sufficient size. When a buffer is finally available, execution must pass to protected mode to obtain the packet from the program 306, a copy must be performed into the buffer and then execution must pass back into V86 mode to pass the buffer to the network driver 312. This processing is very time consuming and the network adapter 314 could easily have completed sending all of the packets in its RAM 316 during this time, thus incurring idle time.

Problems also exist when packets are being received. As shown in FIG. 3, if the Mapper 308 does not have a buffer 310 large enough for a receiving packet and must wait for the program 306 to release a buffer 310, the network adapter 314 may fill up its RAM 316 and experience an overflow of packets. When an overflow occurs, the overflowing packets are lost.

In addition to the problems noted above, using the "best fit" approach has another disadvantage. The Mapper 308, the buffers 310 and the network driver 312 all reside in global address space that is shared by all V86 tasks. When memory is used in the global address space, it cannot be used by other tasks. This makes global address space a resource that should only be used sparingly. However, using the "best fit" approach leads to wasted memory since there will almost always be more space in the buffer than the exact size of the packet (i.e., there is internal fragmentation). Buffer sizes can be adjusted so as to minimize this waste, however, the anticipation of packet sizes is very difficult since different applications and network adapters use different packet sizes. Therefore, the "best fit" approach is not an optimal use of global address space.

SUMMARY OF THE INVENTION

In accordance with a first aspect of the present invention, a method is executed in a distributed system having a number of computer systems that are interconnected by a network. In accordance with this method of the first aspect of the present invention, at least one of the computers contains a storage device, a network adapter and a V86 mode driver. During the transmission of packets, this method stores packets into a single buffer that resides within a portion of memory that is accessible by V86 mode drivers. Also during the transmission of packets, this method retrieves packets from the buffer while using a V86 mode driver.

In accordance with a second aspect of the present invention, the distributed system includes a network, a storage device and a processing means. The network provides for transmitting network packets. The storage device, which is connected to the network, has a portion that is accessible by V86 mode programs and contains a buffer. The processing means contains a packet loader for loading network packets into the buffer and a packet retriever for retrieving packets from the buffer.

DETAILED DESCRIPTION OF THE INVENTION

The preferred embodiment of the present invention provides an improvement over the prior art for buffering packets when a V86 mode network driver is used. The preferred embodiment of the present invention improves memory utilization over the prior art by using a circular buffer that is accessible by the V86 mode network driver. Packet order is maintained within the circular buffer by the packets being processed in a first-in-first-out (FIFO) fashion. In addition, the preferred embodiment of the present invention provides higher system throughput by minimizing network adapter idle time and provides greater data reliability by minimizing the number of packets lost.

Figure 1:
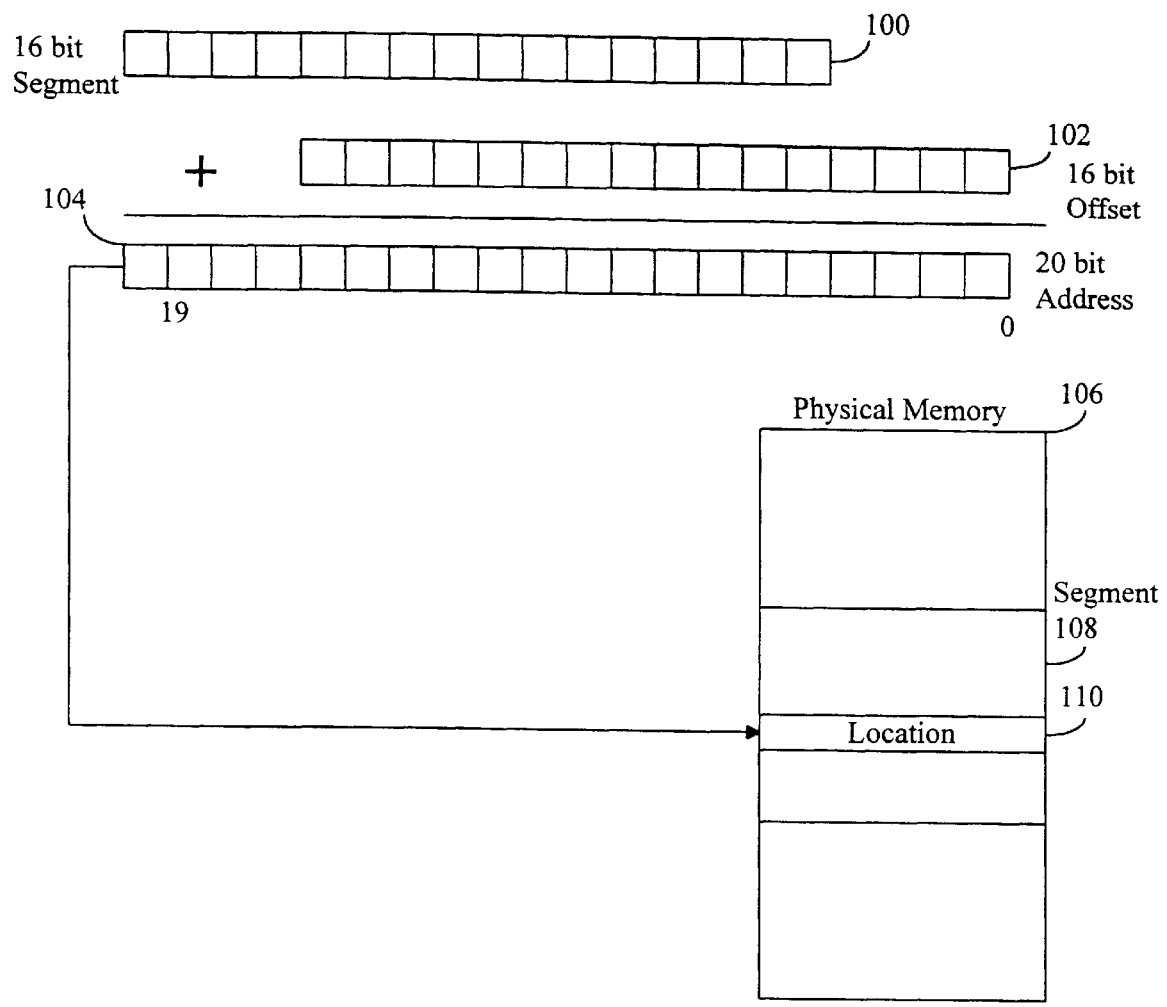
FIG. 1 depicts the addressing scheme employed for the 8088 microprocessor.
Figure 2:
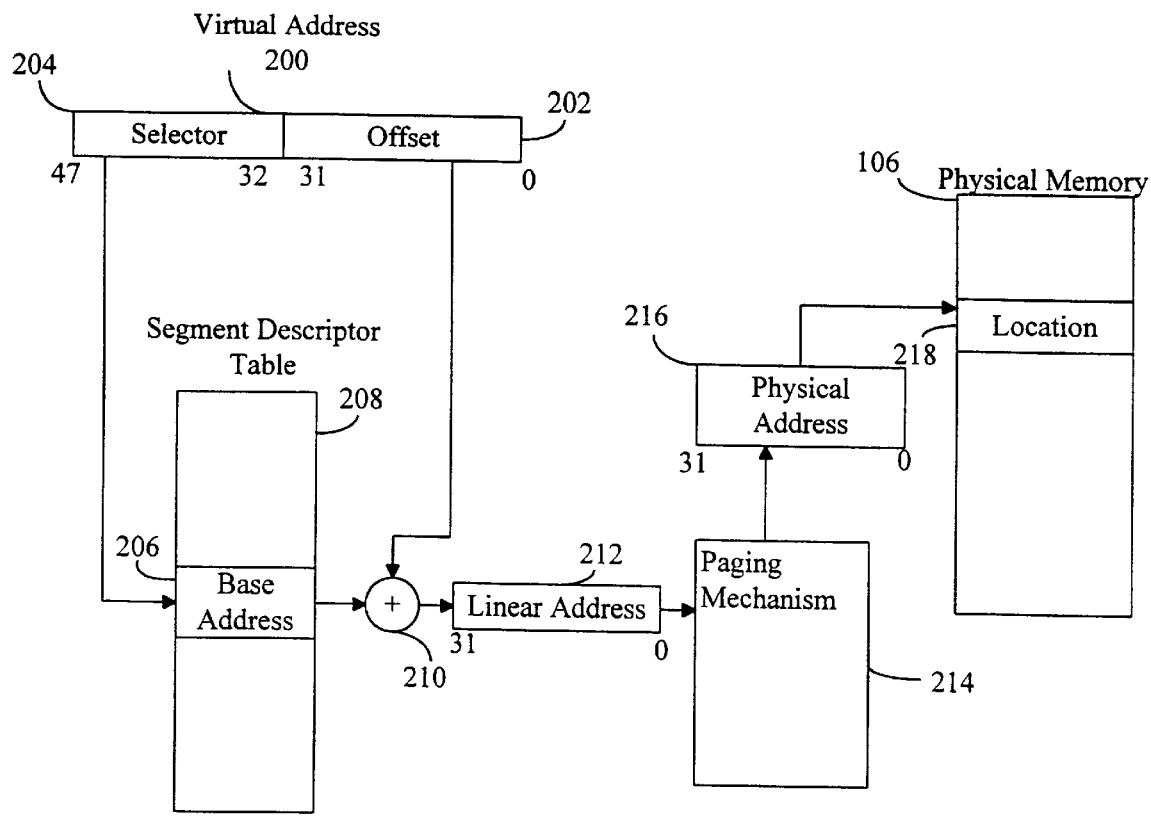
FIG. 2 depicts the addressing scheme employed for the 80386 microprocessor executing in protected mode.
Figure 3:
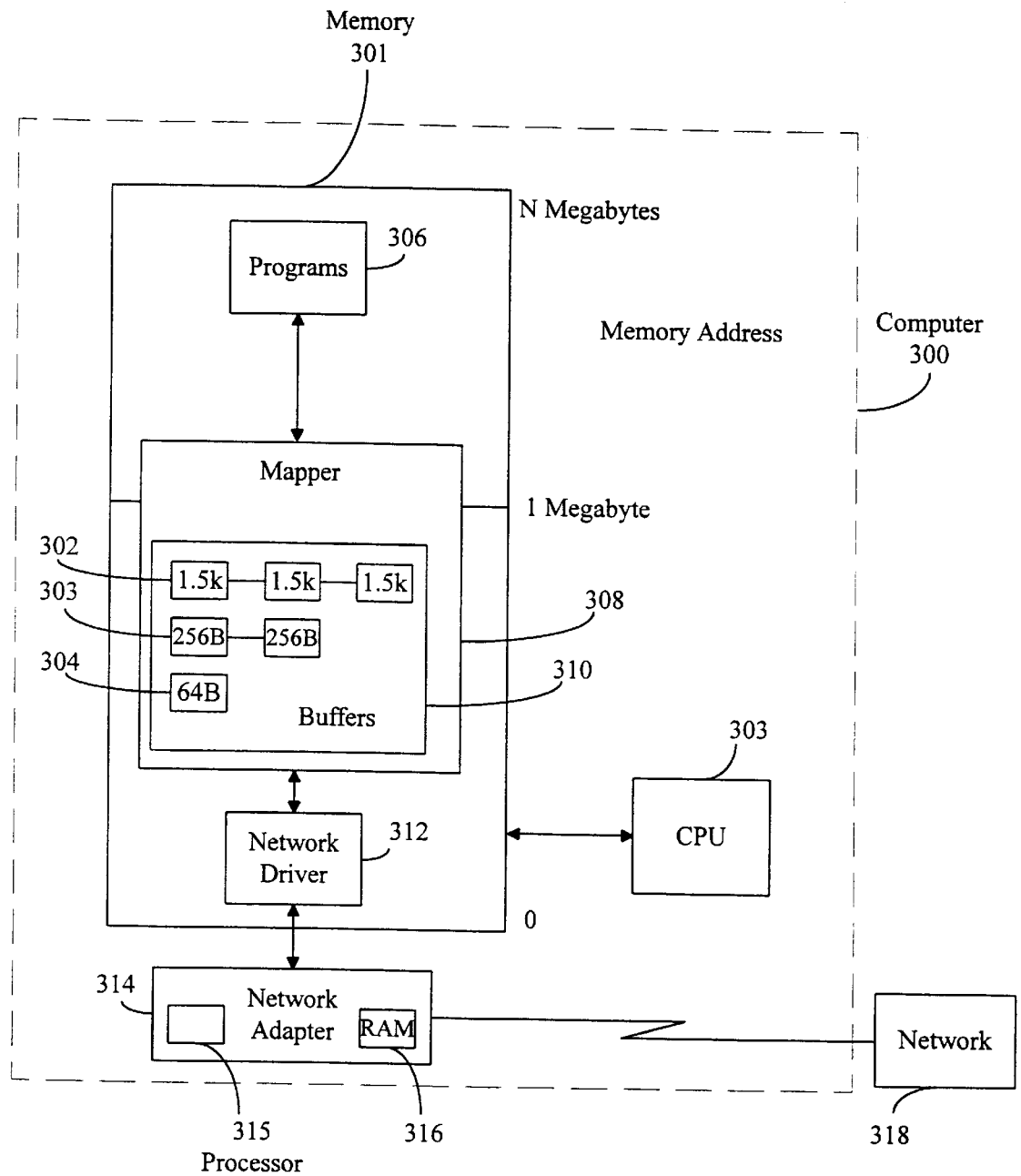
FIG. 3 depicts a prior art system for buffering network packets.
Figure 4:
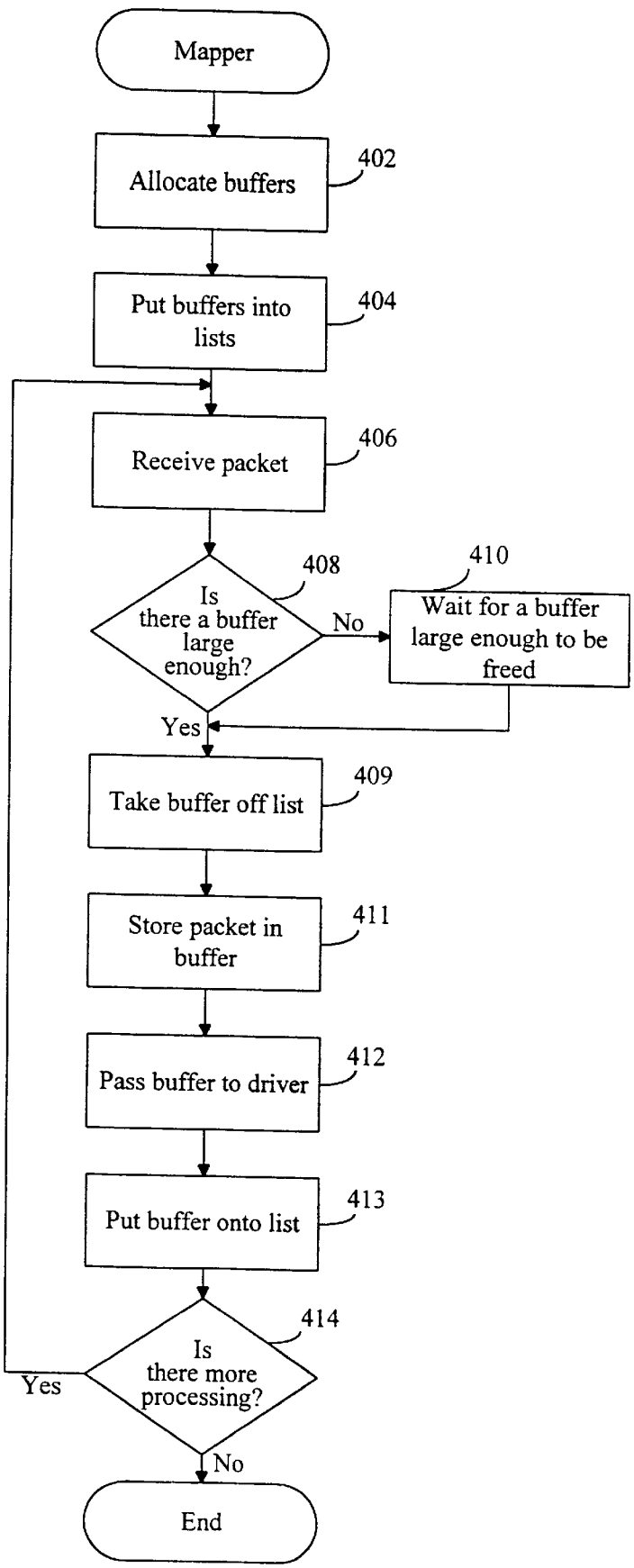
FIG. 4 depicts a flow chart of the steps performed in a prior art system of buffering network packets.
Figure 5:
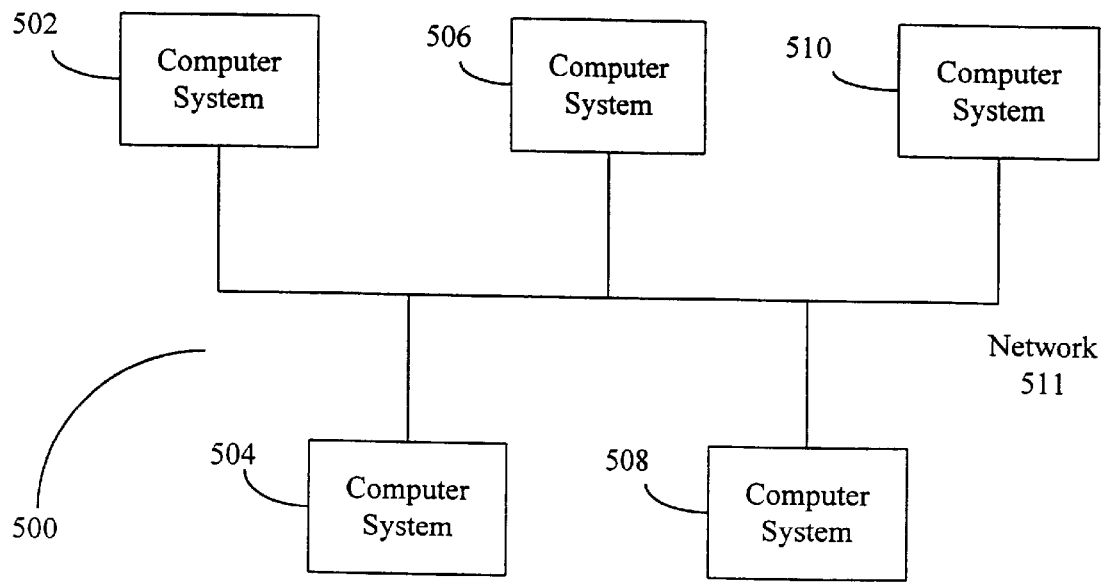
FIG. 5 depicts a sample distributed system for practicing the preferred embodiment of the present invention.

FIG. 5 shows a distributed system 500 suitable for practicing the preferred embodiment of the present invention. The distributed system 500 includes computer systems 502, 504, 506, 508 and 510 that are interconnected by a network 511. The network 511 may be a local area network (LAN), a wide area network (WAN) or other suitable interconnection mechanism. Those skilled in the art will appreciate that the configuration for the distributed system 500 shown in FIG. 5 is merely illustrative. The present invention may also be practiced on other distributed system configurations.

Figure 6:
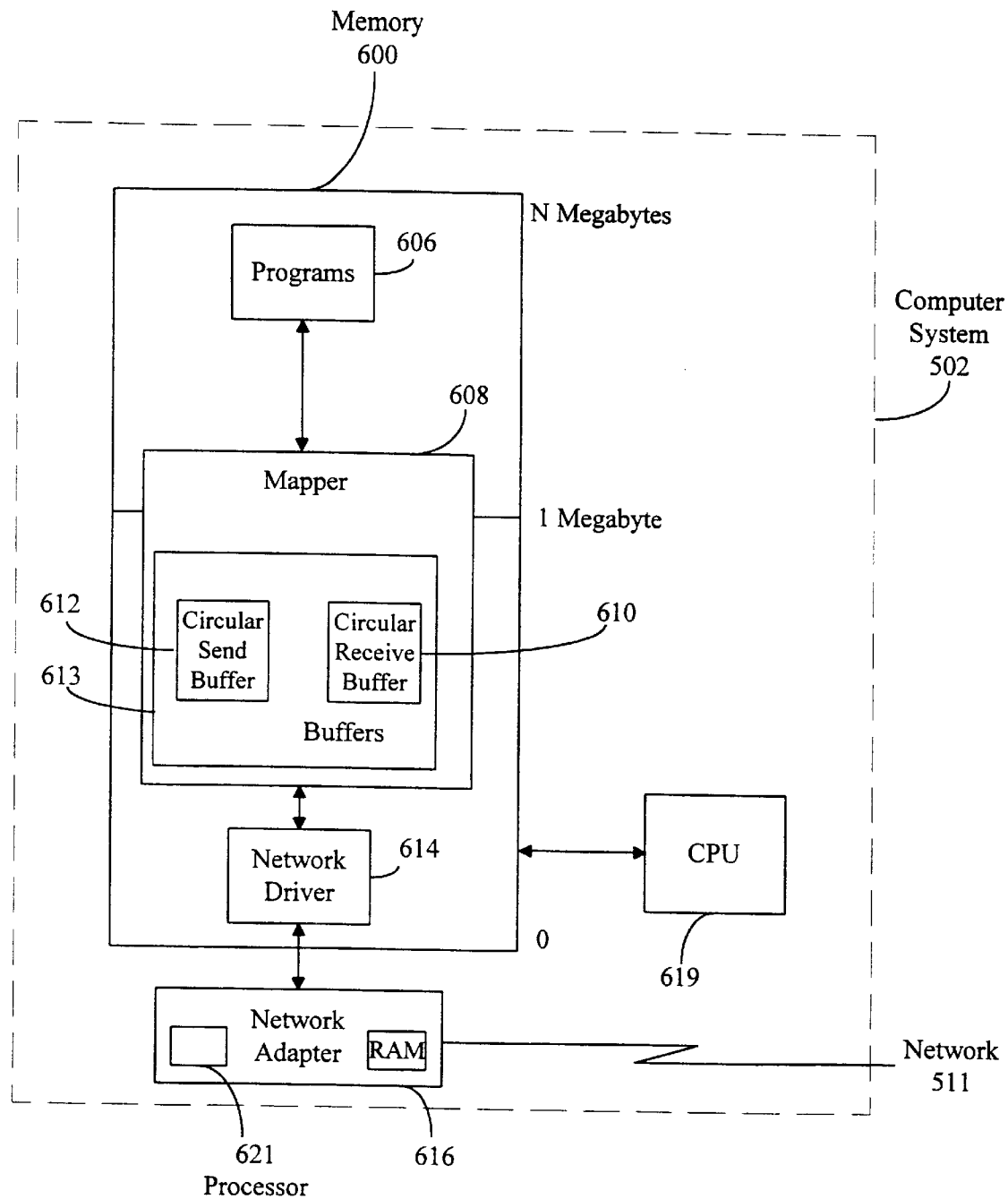
FIG. 6 shows a more detailed block diagram of a computer system of FIG. 5.

FIG. 6 shows a more detailed block diagram of computer 502. Those skilled in the art will appreciate that the other computer systems 504, 506, 508, 510 may include similar components. The computer system 502 includes a central processing unit (CPU) 619, memory 600 and a network adapter 616. The network adapter 616 includes a processor 621 and resident RAM. The network adapter 616 generally takes the form of an expansion card and is connected to a network 511 that enables communications with other computers. The network adapter 616 is controlled by a network driver 614 that is resident in the memory 600 of the computer system 502. The network driver 614 is executed in V86 mode, thus it resides in the first megabyte of the virtual memory 600 of the computer system 502. Programs 606 act as originators and end recipients of packets that are transmitted across the network 511. The programs 606 may be protocol drivers. The programs 606 generally execute in protected mode and, thus, do not have to reside within the first megabyte of memory. The network driver 614 and the programs 606 exchange packets through a Mapper 608. The Mapper 608 includes portions that execute in protected mode and portions that execute in V86 mode. Buffers 613 are provided in the first megabyte of memory to buffer packets between the programs 606 and the network driver 614. The buffers 613 include a circular send buffer 612 and a circular receive buffer 610 that will be described in more detail below.

Although the programs 606 are described as being the originators and the end recipients of packets, one skilled in the art will recognize that the programs may be code segments, processes, libraries or other entities that are capable of generating packets or receiving packets. In addition, although the description of the present invention refers to the use of packets, one skilled in the art would recognize that the present invention may also be used with other forms of data. Further, one skilled in the art would recognize that the circular buffer could be implemented so that the size of the circular buffer changes at runtime.

Although FIG. 6 shows only a single circular send buffer 612 and a single circular receive buffer 610, it should be appreciated that larger numbers of buffers may be employed. For example, when the network driver 614 is an Open Data Link Interface (ODI) network driver, distributed by Novell Corporation of Provo, Utah, one circular send buffer 612 and one circular receive buffer 610 are required. Further, when the network driver 614 is a Network Driver Interface Specification (NDIS) V86 mode driver, distributed by Microsoft Corporation of Redmond, Wash., one circular send buffer 612 is used for all network drivers; however, one non-circular buffer is used as a receive buffer per adapter. The receive buffer is not circular because the NDIS network driver provides synchronous communications for packet reception and never receives more than one packet at a time.

Figure 7:
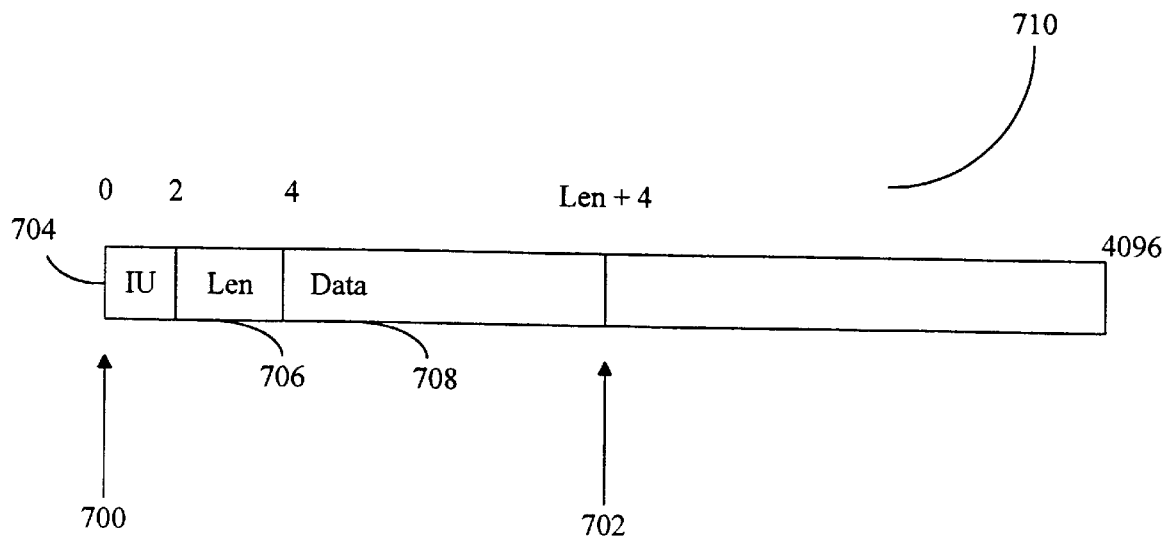
FIG. 7 depicts a circular buffer employed in the preferred embodiment of the present invention.

The circular send buffer 612 and the circular receive buffer 610 are of like configuration. FIG. 7 shows the configuration of such buffers. These circular buffers 610 and 612 are pre-allocated in the first Megabyte of memory at the time of system start-up and are maintained during the life time of the system by the Mapper 608. Each of the circular buffers 710 is of a fixed length. In FIG. 7, the buffer 710 has a length of 4k (i.e., 4096 bytes). The buffer 710 has a physical beginning and a physical end as well as a logical beginning ("head") and a logical end ("tail"). Pointers are maintained to specify the logical beginning and the logical end of the buffer 710. The pointer TxStart 700 points to the logical head of the circular buffer 710, whereas the pointer TxStop 702 points to the logical tail of the circular buffer 710. Other status information is maintained for the circular buffer 710. This status information includes a value designated as TxLen, which equals the total length of the buffer 710; a value TxAvail, which specifies the amount of buffer space available; and a value known as Requests, which specifies the number of packets currently in the buffer 710.

When a packet is stored in a circular buffer 710, a header is added to the packet. The header includes two fields 704 and 706, as shown in FIG. 7. The first two bytes of the header contain the In Use ("IU") flag 704 which signifies whether this portion of the buffer 710 is still in use or is free to be used by another packet. The second field, the Len (short for length) field 706, is also two bytes long and specifies the length of the data 708 in this portion of the buffer 710. The data field 708 is variable length depending on the size of the packet.

Figure 8:
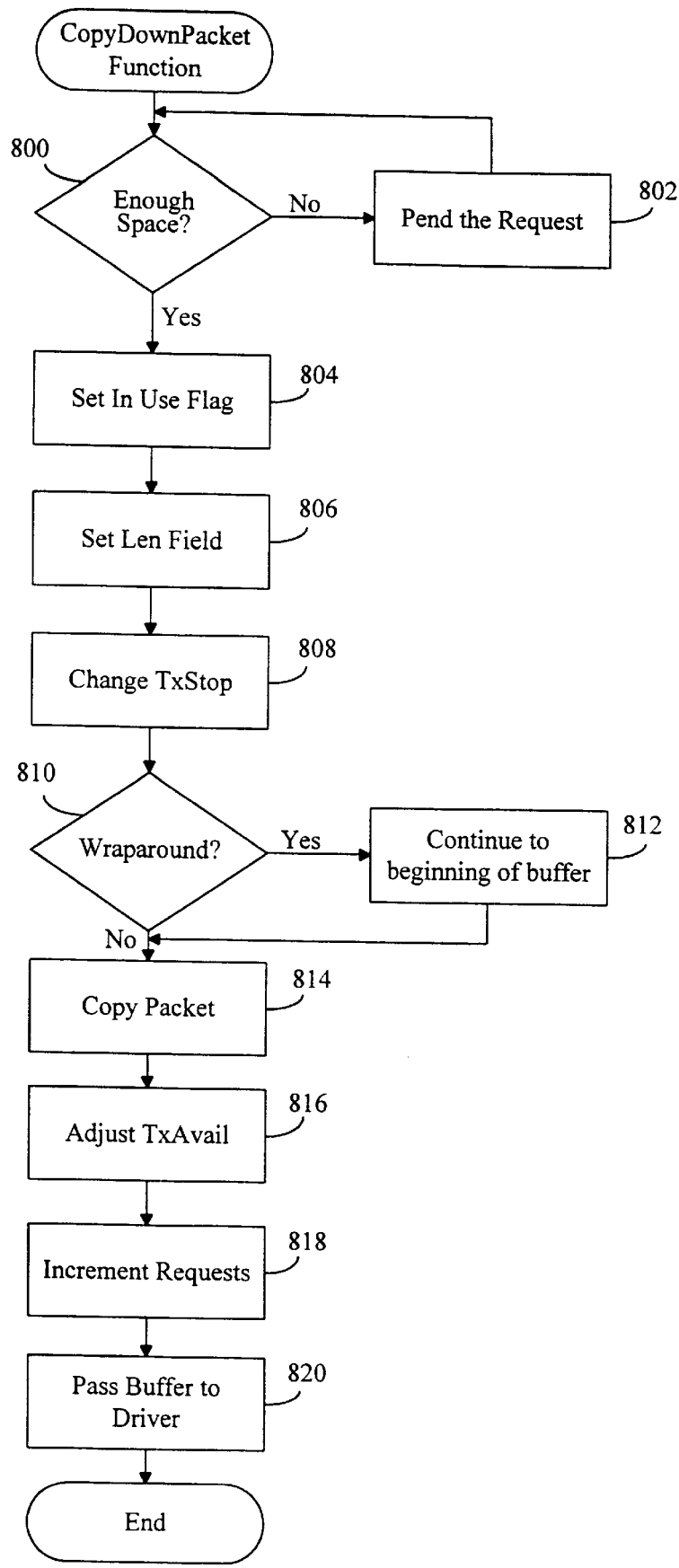
FIG. 8 depicts a flow chart of the steps performed by the CopyDownPacket function in the preferred embodiment of the present invention.

The Mapper 608 is responsible for writing packets received from the programs 606 into the circular buffers 610. The Mapper 608 calls a CopyDownPacket routine in order to copy a packet from the programs 606 into a buffer that is then submitted to the network driver for transmission across the network. By using the CopyDownPacket routine, memory utilization is enhanced because there is no internal fragmentation within the buffer. In addition, system throughput is increased due to the Mapper 608 not being limited to a fixed number of fixed sized buffers, thus the only time that the Mapper must wait for a portion of the buffer to become available is when the buffer is entirely full, in which case throughput does not suffer. FIG. 8 shows a flow chart of the steps performed by the CopyDownPacket Routine. The CopyDownPacket routine first determines if there is sufficient room in the buffer 710 to store the packet (step 800). This determination is done by comparing the packet size with the value TxAvail, which specifies the available space in the buffer 710. If there is not enough available space in the buffer 710, then the Mapper 608 waits and does not send the request ("pends the request") (step 802) and the request is tried again later. If there is sufficient room in the buffer 710, then the In Use flag 704 is set to indicate that the portion of the buffer to be occupied by the packet is in use (step 804). In addition, the amount of memory in the buffer 710 that the packet occupies is written into the len field 706. Next, TxStop 702 is incremented by the size of the packet plus four bytes, to account for the header information (step 808). If when TxStop 702 is incremented, the value of TxStop 702 exceeds the buffer range (i.e., beyond the physical end of the buffer) (see step 810), the value of TxStop is set to wrap around to the beginning of the buffer (step 812). Next, the packet is copied into the data field 708 of the allocated portion of buffer 710 (step 814). Finally, the value TxAvail is decremented by the amount of buffer space occupied by the packet to reflect the storage of the packet therein (step 816). The "Requests" variable is incremented by one to indicate that another request has been processed (step 818), and the Mapper 608 passes the address of the portion of the buffer to the network driver 614 (step 820). After the network driver 614 receives the address of the portion of the buffer, the network driver 614 copies the packet out of the buffer and then copies the packet into the RAM of the network adapter 616. The network adapter 616, in turn, sends the packet across the network 511.

Figure 9:
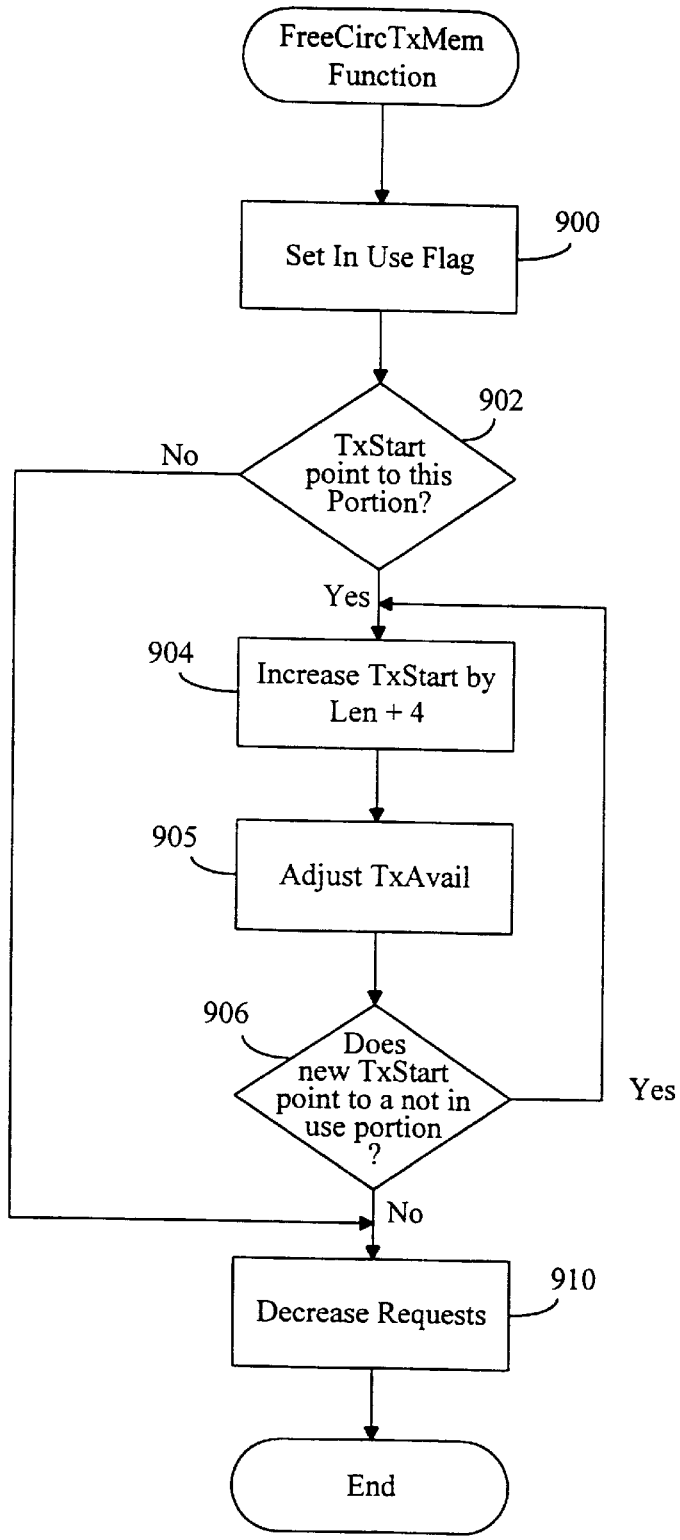
FIG. 9 depicts a flow chart of the steps performed by the FreeCircTxMem function in the preferred embodiment of the present invention.

After a packet has been sent from the circular receive buffer 610 or the circular send buffer 612, the Mapper needs to free up the buffer space that held the packet so that the space may again be used. The FreeCircTxMem routine performs this task. FIG. 9 shows a flow chart of the steps performed by the FreeCircTxMem Routine. First, the "In Use" flag 704 is set to "not in use" for the packet that has been sent (step 900). Then, if the TxStart pointer 700 is pointing to the beginning of the buffer space that held the packet (see step 902), the TxStart pointer 700 is incremented by the len field 706 plus four (step 904) and TxAvail is incremented by the len field 706 plus four (step 905). If TxStart 700 previously pointed to the space that the packet resided in and if, after being incremented, the new TxStart 700 points to a portion of the buffer that is not in use (step 906), TxStart 700 is again incremented by the value in the len field 706 (step 904) and TxAvail is again incremented by the value in the len field 706 plus four (step 905). The incrementing of TxStart 700 continues until it is determined that the buffer 710 is entirely empty or until a portion of the buffer 710 is found that has the in use field 704 marked as "In Use." Next, the "Requests" variable is decremented by one (step 910). However, if the TxStart pointer 700 does not point to the portion of the buffer 710 that the packet resided in (step 902), the Mapper merely decrements the "Requests" variable (step 910).

The circular receive buffer 610 must also be able to receive packets. The circular receive buffer 610 receives packets from the network 511 by using the ReceivePacket routine. The ReceivePacket routine accepts a packet from the network driver 614 and passes it to the programs 606. When an asynchronous network driver is receiving a packet, such as the ODI network driver, the driver sends the Mapper 608 a "ReceiveLookAhead" message. This message indicates that a packet is being received, and the message also contains up to the first 128 bytes of the packet. After the network driver 614 has received the entire packet, the driver sends a "Complete" message to the Mapper 608 to indicate that the entire packet has been received. A complication arises because the communications through the network adapter 616 and network driver 614 are occurring asynchronously, hence, it is possible that "complete" messages may arrive out of the order of the "ReceiveLookAhead" messages. Therefore, if every time a complete is received by the Mapper 608, the Mapper 608 hands off the packet to the programs 606, the packets will fall out of order. The present invention overcomes this problem.

Figure 10:
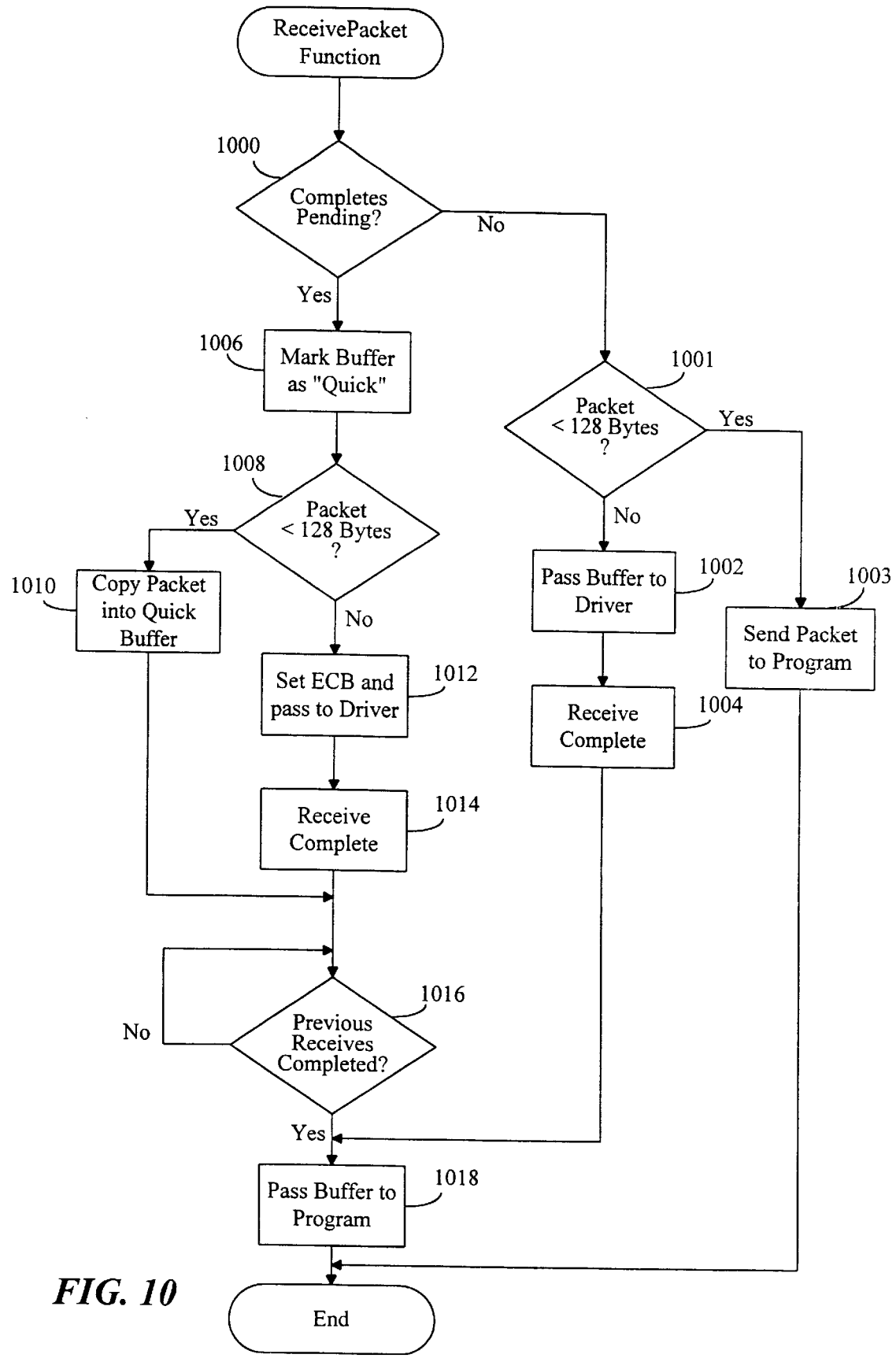
FIG. 10 depicts a flow chart of the steps performed by the ReceivePacket function in the preferred embodiment of the present invention.

FIG. 10 shows a flow chart of the steps performed by the ReceivePacket routine. When the ReceivePacket routine first receives a ReceiveLookAhead packet from the network driver 614, the Mapper 608 determines if there are any packets for which "Complete" messages have not been received (step 1000). If there are no "Complete" messages outstanding, then the Mapper determines if the packet is less than 128 bytes (step 1001). If the packet is less than 128 bytes, the packet is sent directly to the program 606 (step 1003), no buffering is needed. If the packet is greater than 128 bytes (step 1001), the Mapper 608 allocates a portion of the buffer, passes the address of the portion of the buffer to the network driver 614 (step 1002), waits for the network driver 614 to complete filling in the packet into the portion of the buffer(step 1004), and then sends the address of the portion of the buffer to the programs 606 (step 1018). However, if there are complete messages that are outstanding, when the Mapper 608 receives a ReceiveLookAhead message, the Mapper 608 marks the next available portion of the circular buffer 710 in the In Use field 704 as a quick buffer (step 1006). Marking a portion of the buffer as a quick buffer signifies that the address of the buffer cannot be sent to the programs 606 until all of the preceding outstanding complete messages have been received. By using a quick buffer, the Mapper 608 ensures that the order of the packets is maintained, thus providing data integrity. Next, the Mapper 608 determines if the packet is less than 128 bytes (step 1008). If the packet is less than 128 bytes, the Mapper 608 automatically copies the packet into the quick buffer (step 1010). Otherwise, the Mapper 608 must create an ECB 1012 (memory block descriptor), which contains an address to a quick buffer, and passes the ECB to the network driver 614. In addition, the Mapper 608 will store the address of the ECB in the "Len" field 706 of the quick buffer (step 1012). The network driver 614 next fills in the portion of the buffer with the received packet and notifies the Mapper 608 when it has completed (step 1014). Upon receiving the "Complete" message for this receive, the Mapper 608 must wait for all of the previous outstanding complete messages to be received (step 1016) before it can pass the address of the portion of the buffer up to the programs 606 (step 1018). Finally, when all outstanding complete messages have been received, the Mapper 608 then passes the address of the quick buffer wherein the packet resides to the programs 606 (step 1018).

While the present invention has been described with reference to a preferred embodiment thereof, those skilled in the art will know of various changes in form that may be made without departing from the spirit and scope of the claimed invention as defined in the appended claims.

I claim:

1. A method for receiving packets in a computer system having a processor executing in a plurality of modes and having a network driver receiving the packets, the method comprising the steps of:

receiving a first message from the network driver indicating that the network driver has started receiving a first packet, wherein the network driver is executed by the processor while in a first of the plurality of modes;

determining whether a second packet other than the first packet is being received;

when it is determined that the second packet is not being received, passing a reference to a portion of a circular buffer to the network driver to enable the network driver to store the first packet into the portion of the circular buffer;

receiving a second message from the network driver indicating that the network driver has completed receiving the first packet;

passing the reference to the portion of the circular buffer to a recipient program, wherein the recipient program is executed by the processor while in a second of the plurality of modes; and when it is determined that the second packet is being received,
    passing the reference to the portion of the circular buffer to the network driver to enable the network driver to store the first packet into the portion of the circular buffer;
    receiving the second message from the network driver indicating that the network driver has completed receiving the first packet;
    waiting until receiving a third message from the network driver indicating that the second packet has been received completely, said waiting performed to maintain an ordering of the first packet and the second packet so that the first packet is not sent to the recipient program before the second packet; and
    passing the reference to the portion of the circular buffer to the recipient program after receiving the third message indicating that the second packet has been received completely.

2. The method of claim 1 wherein the first message contains a predetermined amount of data contained in the first packet, wherein the step of determining whether a second packet is being received includes determining whether a size of the first packet is less than the predetermined amount of data, and wherein the method further includes the step of:
    when it is determined that the second packet is not being received and the size of the first packet is less than the predetermined amount of data,
        passing the first packet to the recipient program such that the first packet need not be stored into the circular buffer.

3. The method of claim 1 wherein the first message contains a predetermined amount of data contained in the first packet, wherein the step of determining whether a second packet is being received includes determining whether a size of the first packet is less than the predetermined amount of data, and wherein the method further includes the steps of:
    when it is determined that the second packet is being received and the size of the first packet is less than the predetermined amount of data,
        waiting until receiving the third message from the network driver indicating that the second packet has been received completely, said waiting performed to maintain an ordering of the first packet and the second packet so that the first packet is not sent to the recipient program before the second packet; and
        sending the first packet to the recipient program such that the first packet need not be stored into the circular buffer.

4. The method of claim 1 wherein the computer system has a memory and wherein the first mode of the processor is a V86 mode such that a portion of the memory is addressable by the processor while executing in the V86 mode.

5. The method of claim 1 wherein the computer system has a memory and wherein the second mode of the processor is a protected mode such that an entire portion of the memory is addressable by the processor while executing in the protected mode.

6. The method of claim 1, further including the step of:
    when it is determined that the second packet is being received, marking the portion of the circular buffer to indicate that the reference to the portion of the circular buffer cannot be passed to the recipient program until receiving the third message from the network driver indicating that the second packet has been received completely.

7. The method of claim 1, further including the step of marking the portion of the circular buffer to indicate that the portion is reusable after passing the reference to the portion of the circular buffer to the recipient program.

8. The method of claim 1 wherein the computer system contains an originator program for sending a third packet and contains a circular send buffer for storing the third packet, and wherein the method includes:
    receiving the third packet from the originator program;
    storing the third packet into a portion of the circular send buffer; and
    passing a reference to the portion of the circular send buffer to the network driver.

9. A computer system connected to a network comprising:
    a processor executing in a plurality of modes; and
    a memory containing:
        a network driver for receiving packets from the network, for generating messages indicating that the network driver has started receiving a given packet, and for generating messages indicating that the given packet has been received completely, the network driver executed by the processor while in a first of the plurality of modes;
        a recipient program for receiving the packets, the recipient program executed by the processor while in a second of the plurality of modes;
        a circular buffer for storing the packets while the packets are being transferred from the network driver to the recipient program; and
        a transfer program for receiving a first message from the network driver indicating that the network driver has started receiving a first packet from the network, for determining whether a second packet other than the first packet is being received by the network driver, for passing a reference to a portion of the circular buffer to the network driver to store the first packet, for receiving a second message from the network driver indicating that the first packet has been received completely, for waiting until receiving a third message from the network driver indicating that the second packet has been received completely when it is determined that the second packet is being received, and for sending the portion of the circular buffer to the recipient program so that the recipient program may utilize the first packet.

10. The computer system of claim 9 wherein the first mode of the processor is a V86 mode such that a portion of the memory is addressable by the processor.

11. The computer system of claim 9 wherein the second mode of the processor is a protected mode such that an entire portion of the memory is addressable by the processor.

12. The computer system of claim 9, further including an originator program for sending a third packet and a circular send buffer for storing the third packet, wherein the transfer program receives the third packet, stores the third packet into a portion of the circular send buffer and passes a reference to the portion of the circular send buffer to the network driver, and wherein the network driver receives the reference to the portion of the circular send buffer and sends the third packet across the network.

13. The computer system of claim 12 wherein the processor executes in a protected mode such that an entire portion of the memory is addressable by the processor and wherein the originator program is executed by the processor while in the protected mode.

14. A computer-readable medium containing instructions for controlling a computer system to receive packets, the computer system having a processor executing in a plurality of modes and having a network driver receiving the packets, by performing the steps of:

receiving a first message from the network driver indicating that the network driver has started receiving a first packet, wherein the network driver is executed by the processor while in a first of the plurality of modes;

determining whether a second packet other than the first packet is being received;

when it is determined that the second packet is not being received, passing a reference to a portion of a circular buffer to the network driver to enable the network driver to store the first packet into the portion of the circular buffer;

receiving a second message from the network driver indicating that the network driver has completed receiving the first packet;

passing the reference to the portion of the circular buffer to a recipient program, wherein the recipient program is executed by the processor while in a second of the plurality of modes; and when it is determined that the second packet is being received, passing the reference to the portion of the circular buffer to the network driver to enable the network driver to store the first packet into the portion of the circular buffer;

receiving the second message from the network driver indicating that the network driver has completed receiving the first packet;

waiting until receiving a third message from the network driver indicating that the second packet has been received completely, said waiting performed to maintain an ordering of the first packet and the second packet so that the first packet is not sent to the recipient program before the second packet; and passing the reference to the portion of the circular buffer to the recipient program after receiving the third message indicating that the second packet has been received completely.

15. The computer-readable medium of claim 14 wherein the first message contains a predetermined amount of data contained in the first packet, wherein the step of determining whether a second packet is being received includes determining whether a size of the first packet is less than the predetermined amount of data, and wherein the method further includes the step of:

when it is determined that the second packet is not being received and the size of the first packet is less than the predetermined amount of data, passing the first packet to the recipient program such that the first packet need not be stored into the circular buffer.

16. The computer-readable medium of claim 14 wherein the first message contains a predetermined amount of data contained in the first packet, wherein the step of determining whether a second packet is being received includes determining whether a size of the first packet is less than the predetermined amount of data, and wherein the method further includes the steps of:

when it is determined that the second packet is being received and the size of the first packet is less than the predetermined amount of data, waiting until receiving the third message from the network driver indicating that the second packet has been received completely, said waiting performed to maintain an ordering of the first packet and the second packet so that the first packet is not sent to the recipient program before the second packet; and sending the first packet to the recipient program such that the first packet need not be stored into the circular buffer.

17. The computer-readable medium of claim 14 wherein the computer system has a memory and wherein the first mode of the processor is a V86 mode such that a portion of the memory is addressable by the processor while executing in the V86 mode.

18. The computer-readable medium of claim 14 wherein the computer system has a memory and wherein the second mode of the processor is a protected mode such that an entire portion of the memory is addressable by the processor while executing in the protected mode.

19. The computer-readable medium of claim 14, further including the step of:

when it is determined that the second packet is being received, marking the portion of the circular buffer to indicate that the reference to the portion of the circular buffer cannot be passed to the recipient program until receiving the third message from the network driver indicating that the second packet has been received completely.

20. The computer-readable medium of claim 14, further including the step of marking the portion of the circular buffer to indicate that the portion is reusable after passing the reference to the portion of the circular buffer to the recipient program.

21. The computer-readable medium of claim 14 wherein the computer system contains an originator program for sending a third packet and contains a circular send buffer for storing the third packet, and wherein the method includes:

receiving the third packet from the originator program;

storing the third packet into a portion of the circular send buffer; and passing a reference to the portion of the circular send buffer to the network driver.

* * * * *